(12) United States Patent
Bouazizi et al.

(10) Patent No.: US 10,530,739 B2
(45) Date of Patent: Jan. 7, 2020

(54) METHOD AND APPARATUS FOR ADDRESS RESOLUTION OF MULTICAST/BROADCAST RESOURCES USING DOMAIN NAME SYSTEMS

(71) Applicant: Samsung Electronics Co., Ltd, Suwon-si (KR)

(72) Inventors: Imed Bouazizi, Frisco, TX (US); Kyungmo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 15/297,058

(22) Filed: Oct. 18, 2016

(65) Prior Publication Data

US 2017/0111311 A1    Apr. 20, 2017

Related U.S. Application Data

(60) Provisional application No. 62/243,696, filed on Oct. 20, 2015.

(51) Int. Cl.
| | | |
|---|---|---|
| *G06F 15/16* | (2006.01) | |
| *H04L 29/12* | (2006.01) | |
| *H04W 4/06* | (2009.01) | |
| *H04L 12/58* | (2006.01) | |
| *H04L 29/06* | (2006.01) | |
| *H04L 12/18* | (2006.01) | |

(52) U.S. Cl.
CPC ........ *H04L 61/1511* (2013.01); *H04L 12/189* (2013.01); *H04L 51/38* (2013.01); *H04L 61/305* (2013.01); *H04L 65/4076* (2013.01); *H04W 4/06* (2013.01)

(58) Field of Classification Search
CPC . H04L 61/305; H04L 61/1511; H04L 12/189; H04L 51/38; H04L 65/4076; H04W 4/06
USPC ......................................................... 709/245
See application file for complete search history.

(56) References Cited

U.S. PATENT DOCUMENTS

| | | |
|---|---|---|
| 2008/0267152 A1 | 10/2008 | Alnas et al. |
| 2008/0301744 A1 | 12/2008 | Hutchings |
| 2008/0301766 A1* | 12/2008 | Makino ................... G06F 21/51 726/1 |
| 2013/0138814 A1 | 5/2013 | Kotecha |
| 2014/0222906 A1 | 8/2014 | Isler et al. |

(Continued)

OTHER PUBLICATIONS

Partial Supplementary European Search Report regarding Application No. 16857788.0, dated Jun. 11, 2018, 16 pages.

(Continued)

*Primary Examiner* — Franzt B Jean

(57) ABSTRACT

A user equipment (UE) configured to receive a resource over a multimedia broadcast multicast service (MBMS) includes a processor and a transceiver. The processor is configured to determine whether a uniform resource identifier (URI) is an MBMS URI. The transceiver is configured to transmit a domain name server (DNS) query to a DNS based on the MBMS URI and receive at least one resource record from the DNS. The processor is further configured to determine at least one of a unicast location or a multicast location based on the at least one resource record received from the DNS.

17 Claims, 5 Drawing Sheets

(56) References Cited

U.S. PATENT DOCUMENTS

| | | | |
|---|---|---|---|
| 2014/0229529 A1* | 8/2014 | Barone | H04L 65/4076 709/203 |
| 2016/0227385 A1* | 8/2016 | Ahmad | H04L 65/4061 |
| 2016/0323720 A1* | 11/2016 | Patel | H04W 4/10 |
| 2018/0191666 A1* | 7/2018 | Rahman | H04L 67/16 |

OTHER PUBLICATIONS

Samsung Electronics Co., Ltd., "Resource Addressing in MBMS with DNS Support", 3GPP TSG-SA4 Meeting #86, S4-15xxxx, Oct. 2015, 3 pages.

Samsung Electronics Co., Ltd., "MBMS URL Handling", 3GPP TSG-SA4 Ad-Hoc Meeting, S4-AHI528, Oct. 2015, 2 pages.

MBS SWG Chariman, "Report for MGS SWG ad-hoc #50 conference call on MBMS Extensions and Profiling (MEPRO)—TRAPO—Oct. 8, 2015", 3GPP TSG SA4#86, TDoc S4-151254, Oct. 2015, 8 pages.

Singer et al., "Proposed MBMS URL Forms", TSG SA4 TRAPO Call, Tdoc S4-AHI530, Oct. 2015, 6 pages.

Singer et al., "URLs and HTTP Response Forms for Multicast", Network Working Group; Internet-Draft, Oct. 16, 2014, 12 pages.

"3rd Generation Partnership Project; Technical Specification Group Services and System Aspects; Multimedia Broadcast/Multicast Services (MBMS); Protocols and codecs (Release 14)", 3GPP TS 26.346 v14.0.0, Sep. 2016, 240 pages.

"3rd Generation Partnership Project; Technical Specification Group Services and System Aspects; Multimedia Broadcast/Multicast Services (MBMS); Extensions and profiling (Release 14)", 3GPP TR 26.852 v14.2.0, Sep. 2016, 61 pages.

"Proposals for MBMS Extensions and Profiling," 3GPP TSG-SA4 Meeting #83, S4-150408, Samsung Electronics Co., Ltd., Bratislava, Slovakia, Apr. 13-17, 2015, 9 pages.

"Permanent Document: Use Cases and Design Considerations and Alternatives," 3GPP TSG SA WG4 Meeting #83, S4-150496, Samsung Electronics Ltd. and Ericsson, Bratislava, Slovakia, Apr. 13-17, 2015, 29 pages.

"On the MBMS URL Form," TSG SA#85 Meeting, S4-150937 (derived from S4-150381), Apple, Kobe, Japan, Aug. 24-28, 2015, 9 pages.

Foreign Communication From a Related Counterpart Application, PCT Application No. PCT/KR2016/011817, International Search Report and Written Opinion dated Jan. 24, 2017, 8 pages.

Communication from a foreign patent office in a counterpart foreign application, European Patent Office, "Supplementary European Search Report," Application No. EP 16857788.0, dated Sep. 11, 2018, 13 pages.

Communication pursuant to Article 94(3) EPC dated Mar. 18, 2019 in connection with European Patent Application No. 16 857 788.0, 5 pages.

Notice of Preliminary Rejection dated Apr. 4, 2019 in connection with Korean Patent Application No. dated 10-2018-7012426, 8 pages.

Summons to attend oral proceedings pursuant to Rule 115(1) EPC issued Sep. 26, 2019 regarding Application No. 16857788.0, 5 pages.

* cited by examiner

METHOD AND APPARATUS FOR ADDRESS RESOLUTION OF MULTICAST/BROADCAST RESOURCES USING DOMAIN NAME SYSTEMS

CROSS-REFERENCE TO RELATED APPLICATION AND CLAIM OF PRIORITY

This application claims priority under 35 U.S.C. § 119(e) to U.S. Provisional Patent Application No. 62/243,696 filed on Oct. 20, 2015. The above-identified provisional patent application is hereby incorporated by reference in its entirety.

TECHNICAL FIELD

This disclosure relates generally to wireless data transmission. More specifically, this disclosure relates to a method and apparatus for address resolution of multicast and/or broadcast resources using a domain name system (DNS).

BACKGROUND

Recently, applications executed by client devices in mobile wireless networks have substantially increased the data traffic through the mobile networks. These types of applications can require relatively large amounts of data to be transmitted to or from a client device, such as video data. By increasing the data traffic, these applications can affect mobile operators and the dimensioning of core networks. As the mobile data traffic increases, new challenges can arise, and important network trade-offs may be required. A Multimedia Broadcast/Multicast System (MBMS) may be used to broadcast data to multiple users to reduce the amount of data traffic through the network since the broadcast channel can be received by multiple client devices (rather than requiring transmissions of the same content of each individual client device).

SUMMARY

This disclosure provides a method and apparatus for address resolution of multicast/broadcast resources using domain name systems.

In a first embodiment, a user equipment (UE) configured to receive a resource over a multimedia broadcast multicast service (MBMS) includes a processor and a transceiver. The processor is configured to determine whether a uniform resource identifier (URI) is an MBMS URI. The transceiver is configured to transmit a domain name server (DNS) query to a DNS based on the MBMS URI and receive at least one resource record from the DNS. The processor is further configured to determine at least one of a unicast location or a multicast location based on the at least one resource record received from the DNS.

In a second embodiment, a method for resolving an address in a user equipment (UE) includes determining whether an uniform resource identifier (URI) is a multimedia broadcast multicast services (MBMS) URI. The method also includes transmitting a domain name server (DNS) query to a DNS based on the MBMS URI and receiving at least one resource record from the DNS in response to the DNS query. The method further includes determining at least one of a unicast location or a multicast location based on the at least one resource record received from the DNS.

In a third embodiment, a domain name server (DNS) includes a communication unit and a processor. The communications unit is configured to receive at least one DNS query from a user equipment (UE) The processor is configured to calculate a DNS query frequency. The communications unit is also configured to transmit the DNQ query frequency for a domain name to a multicast server.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

Figure 1:
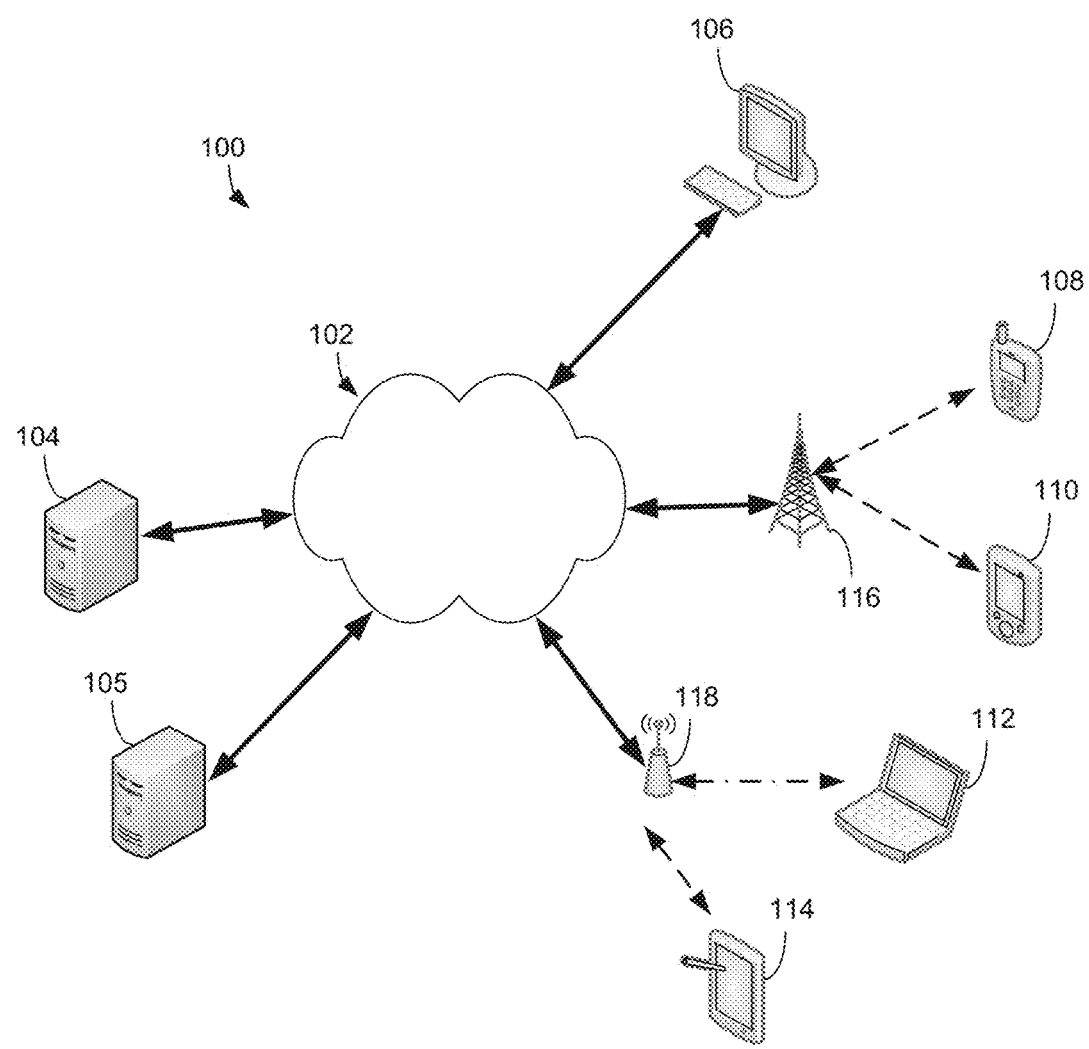
FIG. 1 illustrates an example computing system according to this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 or at least one server 105 and various client devices 106-114. Each server 104, 105 includes any suitable computing or processing device that can provide computing services for one or more client devices. Each server 104, 105 could, for example, include one or more processing devices, one or more memories storing instructions and data, and one or more network interfaces facilitating communication over the network 102. Server 104 may represent a media server or domain name server (DNS) and server 105 may represent a broadcast multicast service center (BM-SC)

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, the client devices 106-114 may be used to access content on the server 104 via a unicast broadcast or access content on the BM-SC via a multicast broadcast.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
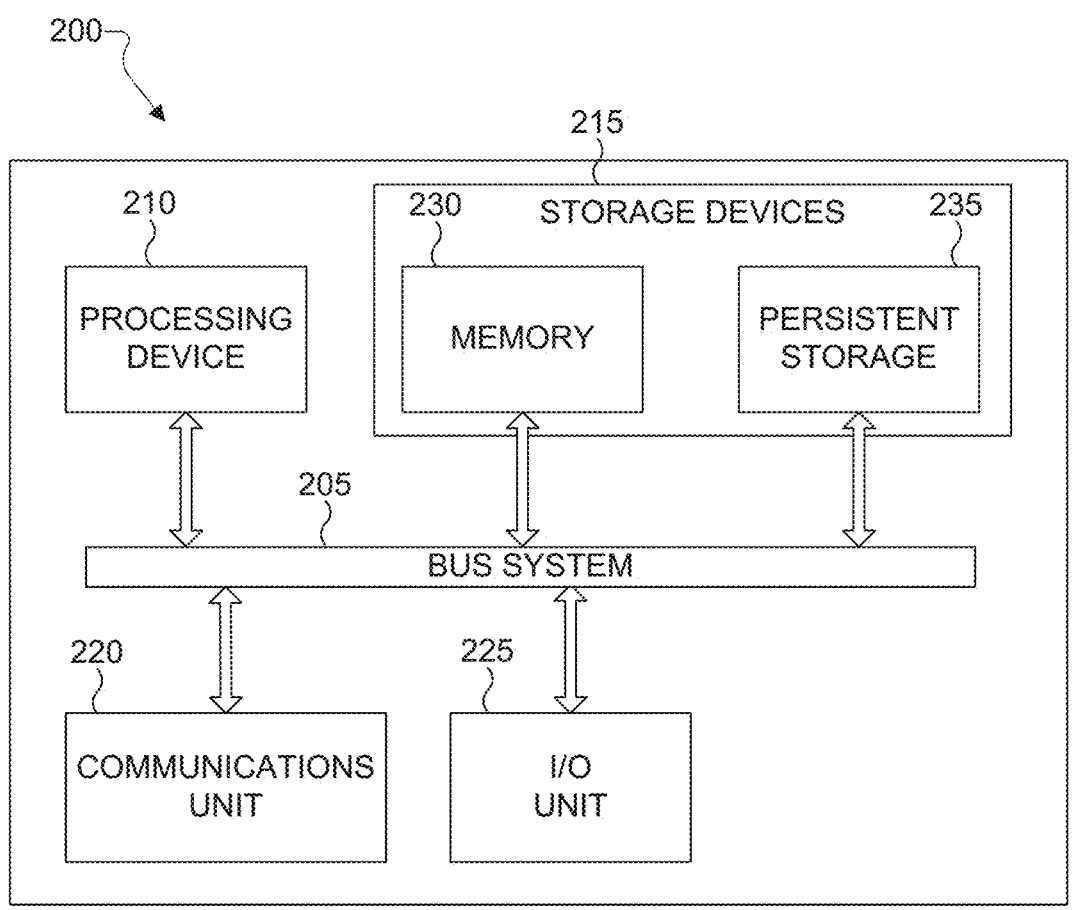
FIGS. 2 and 3 illustrate example devices in a computing system according to this disclosure.
Figure 3:
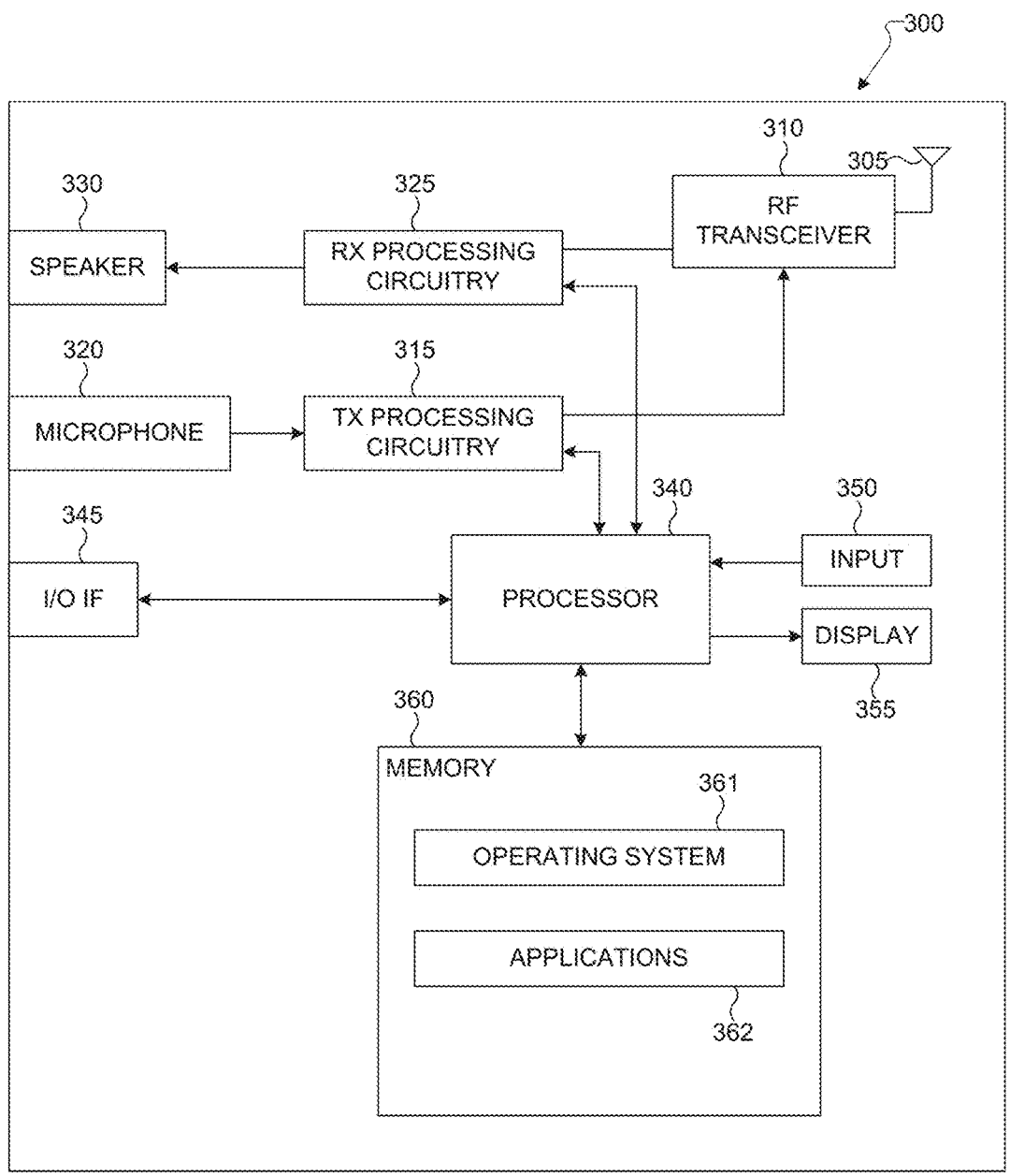

FIGS. 2 and 3 illustrate example devices in a computing system according to this disclosure. In particular, FIG. 2 illustrates an example server 200, and FIG. 3 illustrates an example client device 300. The server 200 could represent the server 104 or server 105 in FIG. 1, and the client device 300 could represent one or more of the client devices 106-114 in FIG. 1.

As shown in FIG. 2, the server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 or server 105 of FIG. 1, the same or similar structure could be used in one or more of the client devices 106-114. For example, a laptop or desktop computer could have the same or similar structure as that shown in FIG. 2.

In the embodiments described herein, server 105 may represent a DNS server. The server 105 registers resource records (RR) for the multimedia broadcast multicast services (MBMS) resources. The server 105 uses DNS resolution requests to assess interest in a resource and changes the DNS records based on a popularity of the resource to point to a unicast or multicast broadcast. The server 105 also calculates the DNS resolution request frequency for specific domain names and reports the DNS resolution request frequency to a BM-SC such as server 104. Specifically, the communication unit 220 may receive one or more DNS resolution requests for a specific domain name and the processing device 210 may calculate the frequency of DNS resolution requests for the specific domain name.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a processor 340, an input/output (I/O) interface (IF) 345, an input 350, a display 355, and a memory 360. The memory 360 includes a operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the client device 300. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from external devices or an operator. The processor 340 is also coupled to the I/O interface 345, which provides the client device 300 with the ability to connect to other devices such as laptop computers and handheld computers. The I/O interface 345 is the communication path between these accessories and the processor 340.

The processor 340 is also coupled to the input 350 and the display unit 355. The operator of the client device 300 can use the input 350 to enter data into the client device 300. For example, the input 350 may be a touchscreen, button, and/or keypad. The display 355 may be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the client device 300 may receive resources via a unicast or multicast broadcast system.

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Figure 4:
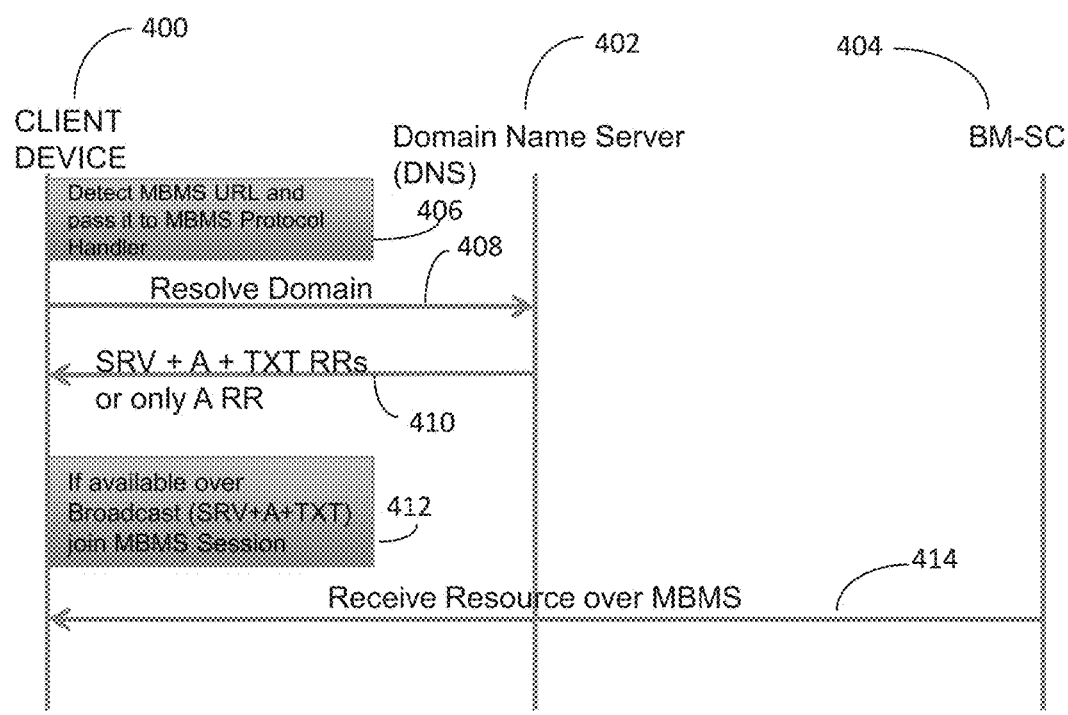
FIG. 4 illustrates example signaling for address resolution of unicast and/or multicast resources using a DNS according to the disclosure.

FIG. 4 illustrates example signaling for address resolution of unicast and/or multicast resources using a DNS according to the disclosure. As shown in FIG. 4 signals are transmitted and received between a client device 400, a DNS 402, and a broadcast multicast service center (BM-SC) 404. The client device may represent the client device 300 of FIG. 3 and the DNS 402 and BM-SC 404 may be represented by the server 200 of FIG. 2.

A user enters a MBMS uniform resource identifier (URI) in the client device 400. The MBMS URI scheme shall comply with the guidelines specified by the Internet Engineering Task Force (IETF). The MBMS URL scheme shall support both resources delivered over hypertext transfer protocol (HTTP) as well as real time streaming protocol (RTSP)/real time transport protocol (RTP) streaming sessions. The MBMS URI handling shall support fallback to unicast delivery if the requested resource is not available over MBMS. The MBMS URI handling shall support MooD by resolving automatically to either a unicast or multicast location. The MBMS URI may have the following syntax:

scheme=mbms-scheme "://" host [":" port] "/" path mbms-scheme="mbms-http"|"mbms-https"|"mbms-rtsp"

As can be seen in the MBMS URI, the MBMS URI includes a unicast fallback which may be determined by removing the "mbms-" prefix from the MBMS URI. In process 406, the client device 400 detects the MBMS URI and passes the MBMS URI to an MBMS protocol handler which may be implemented by processor 340 of client device 300. The MBMS protocol handler transmits the request to the DNS 402 to resolve the domain in process 408.

In process 410, if no resources for the specified domain are being served over multicast, then the response provided to the client device 400 from DNS 402 only contains an A RR that points to the unicast address that resolves for the fully qualified domain name (FQDN) of the corresponding unicast URI. If the resource is available over multicast, the DNS 402 provides an SRV RR, an A RR, and a TXT RR to the client device 400. The SRV RR indicates a multicast Internet Protocol (IP) address, a port number, a Temporary Mobile Group Identity (TMGI) and a File Delivery over Unidirectional Transport protocol (FLUTE) session transport session identifier (TSI). THE SRV RR follows the format:

_mbms._UDP.Request_FQDN TTL IN SRV Priority WeightPort TMGI.BMSC_DN.

where the weight field shall contain the TSI of the FLUTE session, the Port field shall include the destination port number, the target shall contain the TMGI of the session that is used to deliver the resources from the request FQDN and the BMSC_DN provides the domain name of the BM-SC that is serving the content over MBMS. The A RR provides a multicast address and follows the format:

owner-name ttl class rr ipv4

The TXT RR provides additional information or parameters such as an alternative TMGI, a frequency on which the MBMS bearer is to be accessed, a service area on which the service is available, an availability start which provides a start time after which the MBMS broadcast will be available for access, an availability end which provides the end time after which the MBMS broadcast cannot be accessed. One example of TXT RR may follow the following format:

_mbms._additional.FQDN. 14400 IN TXT "alternative_t-mgi-9872987\; frequency=9872349871\; service_area=987r8eq9w70\;"

In process 412, if the resource is available over a multicast broadcast, the client device 400 joins the MBMS session. The client device determines whether the resource is available over a multicast broadcast based on the RRs received from the DNS 402. In process 414, the resource is received over MBMS from the BM-SC 404.

Figure 5:
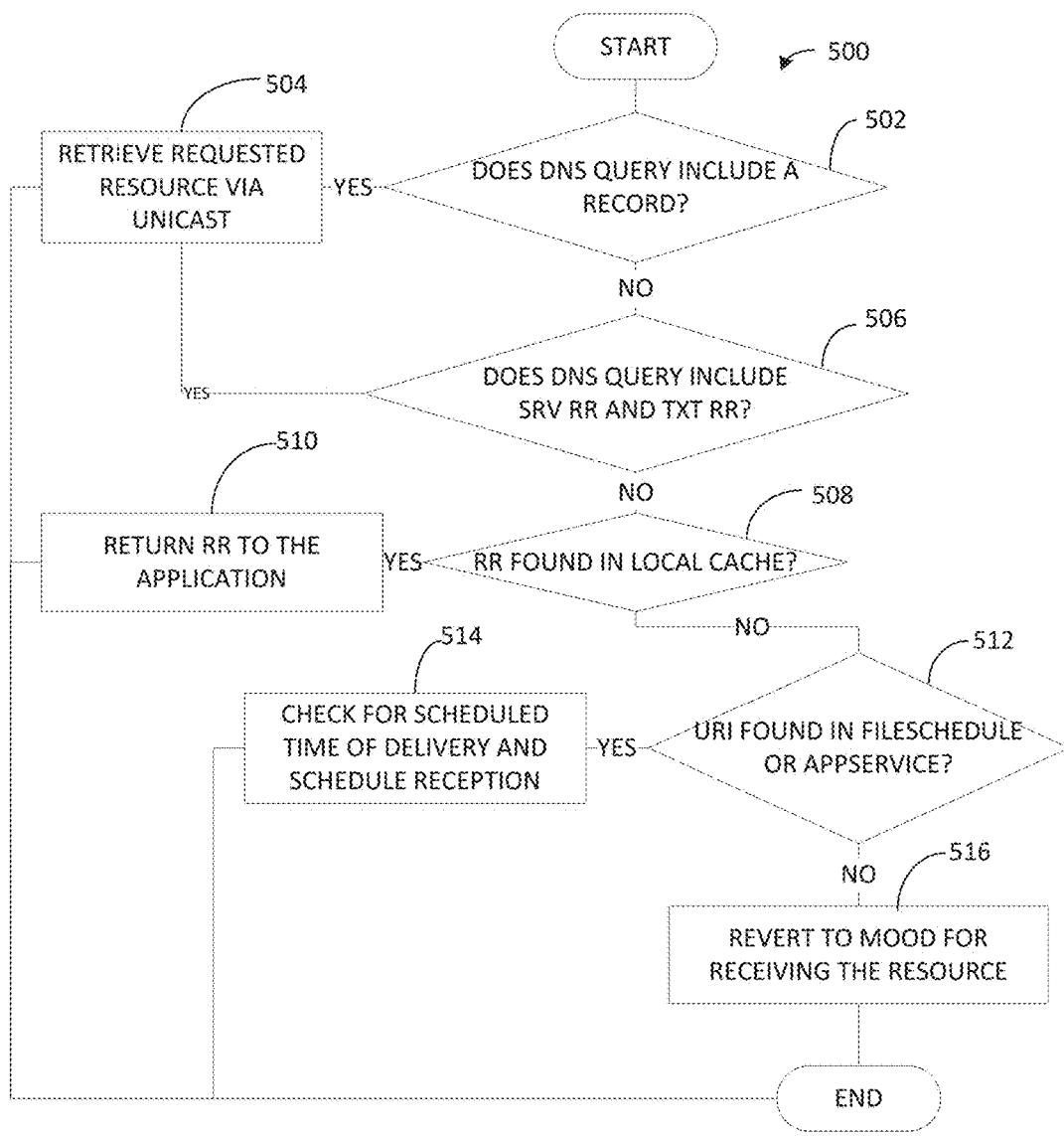
FIG. 5 illustrates an example method for address resolution of multicast and/or unicast resources according to this disclosure.

FIG. 5 illustrates an example method 500 for address resolution of multicast and/or unicast resources according to this disclosure. For ease of explanation, FIG. 5 will be discussed in conjunction with client device 300 of FIG. 3 and the signaling of FIG. 4.

As shown in FIG. 5, upon receiving the response to the DNS query on the MBMS URL FQDN from the DNS 402, the MBMS scheme handler, which may be implemented by processor 340, performs the method 500. The method 500 begins in step 502, where the MBMS scheme handler determines whether the DNS query response includes only an A record that points to a unicast address. If the DNS query response only includes an A record, the MBMS scheme handler determines that the resource is not served by MBMS and the method 500 proceeds to step 504 which retrieves the requested resource using HTTP/HTTPS and the resolved unicast address. If the DNS query response does not include only an A RR, the method 500 proceeds to step 506 where a determination is made as to whether an SRV RR and a TXT RR that provide a service-id NVP, has been received from the DNS 402. If the SRV RR and TXT RR have not been received, the method 500 returns to step 504. If the SRV RR and the TXT RR have been received, the method 500 proceeds to step 508, where MBMS protocol handler checks local cache for RRs with the MBMS URI or the corresponding unicast URI and if found returns the RR to the application in step 510.

If the RR is not located in the local cache, the MBMS protocol handler checks its cached USDs and Schedule Description Metadata fragments for the occurrence of the URI as part of a fileSchedule or an appService in step 512. If found, the MBMS protocol handler checks for the scheduled time of delivery of the resource/stream and if acceptable for the application, the MBMS protocol handler schedules reception of the resource over the multicast broadcast in step 514. If the requested resource is described in one of the existing USDs but the distribution time does not fulfil the requirements of the application or the RR is not found, then unicast retrieval (potentially through a MooD proxy) is attempted in step 516.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE) configured to receive a resource over a multimedia broadcast multicast service (MBMS), the UE comprising:
   a transceiver; and
   a processor operably coupled to the transceiver, and configured to:
      determine whether a uniform resource identifier (URI) is an MBMS URI,
      transmit a domain name system (DNS) query to a DNS server, upon determination that the URI is the MBMS URI,
      receive at least one resource record from the DNS server,
      based on the at least one resource record, determine if a resource is accessible over a unicast channel or a broadcast channel, and
      if the resource is accessible over the broadcast channel, determine access information to access the broadcast channel.

2. The UE of claim 1, wherein the transceiver is configured to receive the resource over the unicast channel or the broadcast channel based on the at least one resource record.

3. The UE of claim 1, wherein the at least one resource record includes a SRV resource record, an A resource record, or a TXT resource record.

4. The UE of claim 3, wherein the processor is configured to join the broadcast channel based on the access information in the SRV resource record, the A resource record, and the TXT resource record.

5. The UE of claim 1, wherein the MBMS URI has a syntax:
   scheme=mbms-scheme "://" host [":" port] "/" path
   mbms-scheme="mbms"|"mbms-http"|"mbms-https"|"mbms-rtsp".

6. The UE of claim 1, wherein the at least one resource record includes an SRV resource record having a syntax:
   mbms._UDP.Request_FQDN TTL IN SRV Priority WeightPort TMGI.BMSC_DN
   where weight includes a transport session identifier (TSI) of a file delivery over unidirectional transport protocol (FLUTE) session, port includes a destination port number, a target includes a temporary mobile group identity (TMGI) of the session that is used to deliver resources from a fully qualified domain name (FQDN) and the BMSC_DN provides a domain name of a broadcast multicast service center (BM-SC) that is serving the resource over MBMS.

7. A method for resolving an address in a user equipment (UE), the method comprising:
determining whether an uniform resource identifier (URI) is a multimedia broadcast multicast services (MBMS) URI;
transmitting a domain name system (DNS) query to a DNS server, upon determination that the URI is the MBMS URI;
receiving at least one resource record from the DNS server;
based on the resource record, determine if a resource is accessible over a unicast channel or a broadcast channel; and
based on the resource being accessible over the broadcast channel, determining access information to access the broadcast channel.

8. The method of claim 7, wherein the at least one resource record includes a SRV resource record, an A resource record, or a TXT resource record.

9. The method of claim 8, further comprising joining the broadcast channel based on the access information in the SRV resource record, the A resource record, and the TXT resource record.

10. The method of claim 7, wherein the MBMS URI has a syntax:
scheme=mbms-scheme "://" host [":" port] "/" path
mbms-scheme="mbms"|"mbms-http"|"mbms-https"|"mbms-rtsp".

11. The method of claim 7, wherein the at least one resource record includes an SRV resource record having a syntax:
mbms._UDP.Request_FQDN TTL IN SRV Priority WeightPort TMGI.BMSC_DN where weight includes a transport session identifier (TSI) of a file delivery over unidirectional transport protocol (FLUTE) session, port includes a destination port number, a target includes a temporary mobile group identity (TMGI) of the session that is used to deliver resources from a fully qualified domain name (FQDN) and the BMSC_DN provides a domain name of a broadcast multicast service center (BM-SC) that is serving the resource over MBMS.

12. A domain name system (DNS) server comprising:
a communications unit configured to receive at least one DNS query from a user equipment (UE); and
a processor configured to calculate a DNS query frequency for a particular Fully Qualified Domain Name (FQDN),
the communications unit is further configured to transmit the DNS query frequency for a FQDN to a broadcast server.

13. The DNS of claim 12, wherein the at least one DNS query is based on an multimedia broadcast multicast service (MBMS) uniform resource identifier (URI).

14. The DNS of claim 13, wherein the MBMS URI has a syntax:
scheme=mbms-scheme "://" host [":" port] "/" path
mbms-scheme="mbms-http"|"mbms-https"|"mbms-rtsp".

15. The DNS of claim 12, wherein the processor is configured to determine at least one resource record based on the DNS query frequency.

16. The DNS of claim 15, wherein the at least one resource record includes a unicast location or a broadcast location.

17. The DNS of claim 15, wherein the communications unit is configured to transmit the at least one resource record to the UE.

* * * * *